US005676431A

United States Patent [19]
McLaughlin et al.

[11] Patent Number: 5,676,431
[45] Date of Patent: Oct. 14, 1997

[54] ELECTROPNEUMATIC PILOT ADAPTER

[75] Inventors: Bryan M. McLaughlin; James R. Truglio, both of Watertown, N.Y.

[73] Assignee: New York Air Brake Corporation, Watertown, N.Y.

[21] Appl. No.: 524,378

[22] Filed: Sep. 6, 1995

[51] Int. Cl.$^6$ ...................................................... B60T 7/00
[52] U.S. Cl. .................................. 303/15; 303/36; 303/74
[58] Field of Search ................................ 303/15, 36–37, 303/44, 66, 74, 77, 80, 86, 69

[56] References Cited

U.S. PATENT DOCUMENTS

| | | | |
|---|---|---|---|
| 2,887,011 | 7/1959 | Cotter. | |
| 2,993,199 | 7/1961 | Browne et al. | |
| 4,052,110 | 10/1977 | Banker | 303/36 |
| 4,264,110 | 4/1981 | Washburn et al. | 303/15 X |
| 5,335,974 | 8/1994 | Klink | 303/7 |
| 5,390,988 | 2/1995 | Shank | 303/15 |
| 5,393,129 | 2/1995 | Troiani et al. | 303/86 X |

Primary Examiner—Peter M. Poon
Attorney, Agent, or Firm—Barnes & Thornburg

[57] ABSTRACT

An adaptor or retrofit unit which is placeable between a pipe bracket and the service portion of a brake control valve which includes brake pipe passage, brake cylinder passage, auxiliary reservoir passage, emergency reservoir passage and an exhaust retainer passage which interconnects the corresponding ports of the pipe bracket and the service brake portion and electrically controlled valves. A first electrically controlled valve selectively controls the connection of the brake pipe passage to a venting port for applying the brakes. A second electrically controlled valve interconnects the brake pipe passage and the emergency reservoir passage for release of the brakes. A third electrically controlled valve selectively connects the auxiliary reservoir to a vent port for releasing a stuck brake. A fourth electrically controlled valve selectively controls the exhaust passage connected to the retainer for gradually releasing the brake.

24 Claims, 2 Drawing Sheets

ELECTROPNEUMATIC PILOT ADAPTER

BACKGROUND AND SUMMARY OF THE INVENTION

The present invention relates generally to electropneumatic brake control valves, more specifically to a retrofit for use with pneumatic brake control valves.

Pneumatic brake control valves presently used in service on each car of the train, includes a service portion and an emergency portion connected to a pipe bracket. The pipes of the trains and reservoirs are connected to the pipe bracket. Such pneumatic brake control valves in service presently include the ABDW and its earlier versions, as well as the DB 60. The control valve responds to air brake pressure in the brake pipe to perform the appropriate braking and release functions. In the United States, they have been designed for direct release versus graduated release. Recently there has been great interest in providing electropneumatic controls at the individual cars at a reduced cost. Since the industry is not ready to accept a complete electropneumatic valve, there has been much development in retrofitting pneumatic brake control valves on the individual trains.

A typical example is U.S. Pat. No. 5,390,988 to Shank which shows an air brake pilot adaptor. The adaptor is a block which includes at least two solenoid valves, and is connected between the service portion of an ABD control valve and an accelerated release valve portion. The first two solenoid valves vents the brake pipe to apply the brakes and vents the auxiliary reservoir at the accelerated release portion to release the brakes. Two additional solenoid valves are provided, one for venting the brake cylinder for gradual release, and one for venting of the auxiliary reservoir at the main service slide valve, without affecting the accelerated release to thereby release a stuck brake. The specific arrangement reduces brake cylinder pressure for graduated release during which time auxiliary reservoir is unable to recharge. The reapplication of the service brake will result in reduction of available brake cylinder pressure.

Other examples of prior art which show electrically assisted application and release of the pneumatic brake at each car is shown by U.S. Pat. No. 2,897,011 to Cotter and U.S. Pat. No. 4,052,110 to Banker. Both of these patents show an electropneumatic application valve connected to the pipe bracket, or between the pipe bracket and the pipes for venting the brake pipe for a brake application and a release valve to connect a supply or control reservoir of the car to the brake pipe to charge the brake pipe during release. These require additional parts and piping which increase the cost and sources of leaks.

With respect to the U.S. Pat. No. 5,390,988, it was designed specifically for an ABD valve. Thus, it would have to be redesigned for each of the different kinds of brake control valves available in the field. With respect to the systems design of the Cotter and Banker patents, they merely provide assists to accelerate brake and release and do not address other areas which are commonly defined by the pneumatic brake control valve and addressed in the Shank patent.

Thus, it is the object of the present invention to provide an electropneumatic pilot adaptor which can be used with an ABD or DB 60 brake control valve.

Another object of the present invention is to provide an electropneumatic pilot adaptor capable of performing the same functions as the Shank patent and usable with all brake control valves.

These and other objects are achieved by an adaptor or retrofit unit which is placeable between a pipe bracket and the service portion of a brake control valve which includes a brake pipe passage, a brake cylinder passage, an auxiliary reservoir passage, an emergency reservoir passage, and an exhaust retainer passage which interconnects the corresponding ports of the pipe bracket and the service brake portion. A first electrically controlled valve on the retrofit unit selectively controls the connection of the brake pipe passage to a venting port for applying the brakes. A second electrically controlled valve interconnects the brake pipe passage and the emergency reservoir passage for release of the brakes. The second electrically controlled valve preferably includes a pneumatic valve controlling the interconnection of the brake pipe passage and the emergency passage, and an electrically controlled valve selectively connecting the emergency reservoir port or a venting port to the pneumatic valve to operate the pneumatic valve. Another electrically controlled valve is provided to selectively connect the auxiliary reservoir to a vent port for releasing a stuck brake. An additional electrically controlled valve selectively controls the exhaust passage connected to the retainer for gradually releasing the brake.

Electronics are provided on the retrofit unit to control the electrically controlled valves and includes appropriate transducers to measure the pressure in the brake pipe passage, brake cylinder passage and the auxiliary reservoir passage. The electronics uses this information to operate the valve which vents the auxiliary reservoir to release a stuck brake. The electronics also control the valve to interconnect the brake pipe and the emergency passage to release the brake when the brake pipe pressure is greater than the auxiliary passage pressure.

In addition to being a retrofit, the retrofit structure may be integrated into a newly designed pipe bracket to be used with pre-existing service and emergency portions. Any or all of the electro-control valves or their functions may be incorporated in the retrofit unit or the modified pipe bracket.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
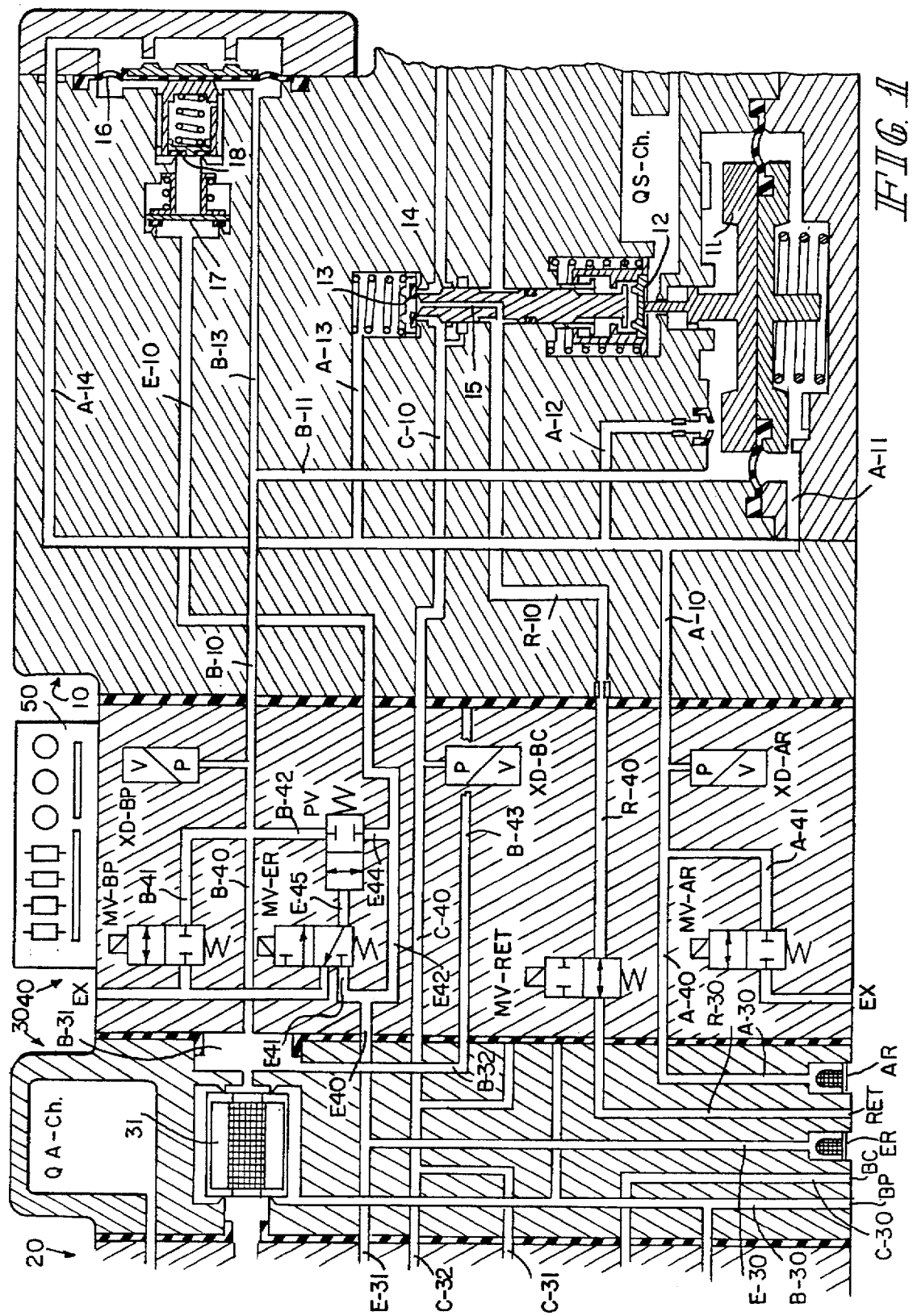
FIG. 1 is a schematic representation of a DB 60 valve, including the electropneumatic retrofit unit therein in accordance with the principles of the present invention.
Figure 2:
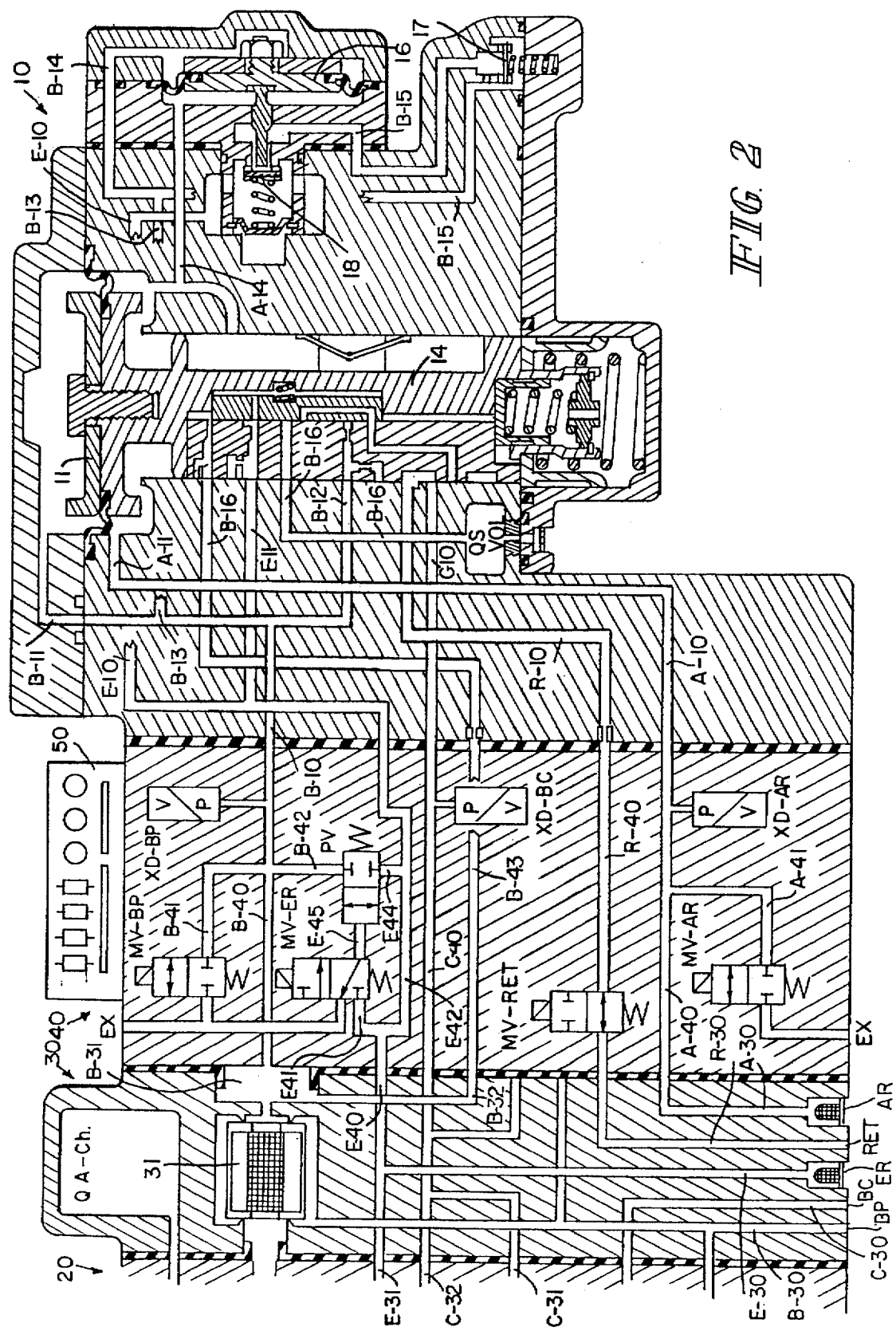
FIG. 2 is a schematic representation of an ABDW, including an electropneumatic retrofit unit therein in accordance with the principles of the present invention.

An electropneumatic retrofit unit 40 is shown in FIGS. 1 and 2, connected between a service portion 10 of a brake control valve and its pipe bracket 30. An emergency section 20 is also shown connected to the opposing face of the pipe bracket 30. Since the electropneumatic retrofit 40 operates only on the service portion 10, the emergency section 20 is only shown as a box. It should also be noted that the pipe bracket 30 is a generic-type bracket which is required in interchange service. FIGS. 1 and 2 show only those portions of the service section of the DB 60 or the ABDW, which are necessary for the understanding of the operation of the retrofit unit. The interconnections are schematic and may not represent the actual path in the brake control valves. With respect to the necessary operation of the device with respect to the retrofit unit, they are accurate.

Pipe bracket 30 includes a brake pipe port BP, a brake cylinder port BC, an emergency reservoir port ER, an exhaust port connected to the retainer RET, and an auxiliary reservoir port AR. To aid in understanding the various passages within the control valve, the brake pipe passages are represented by a "B", the brake cylinder passages by a "C", the emergency reservoir passages by an "E", the retainer passages by an "R", and the auxiliary reservoir passages by an "A". By using an "R" for the retainer passages, it will distinguish it from other exhaust ports. The passage in the service portion 10 will have numbers in the teens, the passages in the pipe bracket 30 will have numbers in the 30's, and the passages in the retrofit interface unit 40 will have reference numbers in the 40's.

Referring specifically to FIG. 1, the brake pipe port BP is connected through brake pipe passage B-30 in the pipe bracket 30 to the filter 31 and passage or chamber B-31 to a brake pipe passage B-40 in the interface 40, which is connected to the brake passage or port B-10 on the service portion 10. Brake pipe passage B-32 connects chamber B-31 to a brake pipe passage B-43 in the interface 40.

The brake cylinder port BC is connected through brake cylinder passage C-30 of the pipe bracket 30 to the emergency portion 20. Brake cylinder passage C-31 and C-32 are interconnected together in the pipe bracket 30, and to brake cylinder passage C-40 in the interface 40 to brake cylinder port and passage C-10 in the service portion 10.

The emergency port ER is connected through emergency passage E-30 and E-31 in the pipe bracket to the emergency portion 20 and to the emergency passage E-40 in the interface 40 and path E-42 to the emergency inlet port and passage E-10 of the service portion 10.

The retainer port RET is connected by retainer passage R-30 in the pipe bracket 30 to retainer passage R-40 in the interface 40 to retainer port and passage R-10 of the service portion 10.

The auxiliary reservoir port AR is connected through auxiliary passage A-30 in the pipe bracket 30 to auxiliary passage A-40 in the interface 40 to auxiliary port and passage A-10 of the service portion 10.

Thus, the interface 40 has at least five passages interconnecting the five interface ports between the pipe bracket 30 and the service portion 10. As will be explained below, each of these passages are generally unobstructed to allow the service portion 10 to operate pneumatically under all conditions. The only passage which is capable of obstruction is the retainer passage R-40 to interrupt the normal operation of the interface between the pipe bracket 30 and the service portion 10 to achieve graduated brake release.

In comparing the interface of FIG. 1 for the DB 60 to the interface of FIG. 2 for the ABDW, the brake pipe passage B-43 in the interface 40 is blocked at its interface with the service portion 10 in FIG. 1, but is connected to the brake pipe passage B-16 of the service portion 10 in FIG. 2.

The brake pipe passage B-40 in the interface 40 is connected by passage B-41 to an exhaust or venting port EX by an electrically controlled valve MV-BP. The valve MV-BP is normally biased in a closed position to disconnect the brake pipe passage B-40, 41 from the exhaust port EX. Upon activation, it connects the brake pipe passage B-40 to accelerate application of the brake. Also connected to the brake pipe passage B-40 is a brake pipe transducer XD-BP. Connected to the brake cylinder passage C-40 is a brake cylinder transducer XD-BC.

The emergency passage E-40 is connected to the brake pipe passage B-40 by an electrically controlled valve. In the embodiment shown, this electro-controlled valve includes an electric controlled valve MV-ER and a pilot valve or pneumatically operated valve PV. The electrically controlled valve MV-ER interconnects the pilot passage E-45 of the pilot valve PV, either to the emergency reservoir via emergency passage E-41, or to exhaust. The valve MV-ER is biased to the position shown wherein the passage E-45 of the pilot valve is connected to exhaust EX. The pilot valve PV connects the emergency passages E-40,E-42,E-44 to the brake pipe passage B-42 and B-40. The valve PV is shown in its spring biased closed position disconnecting the emergency passages and the brake pipe passages in the interface 40. Upon activation of electric control valve MV-ER, the emergency reservoir pressure is provided to the pilot passage E-45, opening the pilot valve PV and connecting the emergency reservoir passages and the brake pipe passages in the interface 40. The connection of the emergency reservoir to the brake pipe accelerates recharging of the brake pipe in the release condition and also accelerates the propagation of the release signal down the brake pipe of the train.

An electrically controlled retainer valve MV-RET controls the retainer passage R-40 in the interface 40. It is spring-biased into its open position, allowing flow through the retainer passage R-40. Upon activation, the valve MV-RET disconnects the passage R-40 and prevents the connection of the brake cylinder to the retainer or exhaust port RET. This is used as will be explained for graduated release of the brakes.

An electrically controlled valve MV-AR is connected to the auxiliary passage A-40 in the interface 40 to exhaust EX via passage A-41. The electrically controlled valve MV-AR is shown spring-biased in its closed position, disconnecting the auxiliary passage A-40 from exhaust EX. When it is activated, it connects the auxiliary passages A-40 and A-41 to exhaust EX. This is used to unbalance the control diaphragm of the service portion to release a stuck brake. A transducer XD-AR is connected to the auxiliary reservoir passage A-40.

Although two exhaust or venting ports EX are shown for the interface 40, they may be separate or common exhaust or venting ports.

Electronics package 50 is connected to and forms part of the interface 40. The electronics passage monitors the reading of the brake pipe, brake cylinder and auxiliary reservoir transducers XD-BP, XD-BC and XD-AR. The electronics 50 also controls the electrically controlled brake pipe, emergency reservoir, retainer and auxiliary reservoir valves MV-BP, MV-ER, MV-RET and MV-AR. The electronics may include a microprocessor to perform the functions as described in U.S. Pat. No. 5,390,988 to Shank. The electronics 50 may make independent local decisions on each of the valves and may be under the control of the controller at the locomotive. Electronics 50 may communicate with the controller at the locomotive via train wire or wireless communication.

The purpose of the interface 40 and the electronics 50 is to assist or augment the service portion 10 and not to replace it. The electronics and the electric-controlled valves of the interface can accelerate or independently initiate application of the brakes by connecting the brake pipe passage B-40 to exhaust using valve MV-BP. Similarly, release of the brakes may be accelerated or initiated by connecting the emergency reservoir passages E-40, E-42 to the brake pipe passages B-40, B-42 by the valves MV-ER and PV. The electronics 50, using brake pipe and auxiliary reservoir transducers XD-BP and XD-AR can sense the differential between the brake pipe and auxiliary reservoir. Once the brake pipe has exceeded the auxiliary reservoir indicating release, the electronics 50 can connect the emergency reservoir to the brake pipe using the valves MV-ER and PV to initiate and accelerate the release function. Alternatively, the electronics may connect the emergency reservoir to the brake pipe based on an externally received electrical signal from the locomotive.

The electronics 50 can also determine if there is a stuck brake cylinder. This is a cylinder that has retained pressure when it is supposed to be in a release position. Electronics may determine this by monitoring the brake pipe pressure with respect to the auxiliary reservoir, the brake pipe pressure by itself, previously received release commands and signals, brake cylinder pressure or a hot-box detector. If a brake is stuck on and not released, the electronics will activate the auxiliary reservoir valve MV-AR which reduces the auxiliary reservoir pressure and causes the service control valve to move to its release position. This can be independent of any signal on the brake pipe line indicating release.

The brake control valve's service portion 10 operate in a direct release mode. The direct release mode is whereupon receiving a release signal, either pneumatic or electrically, the service portion 10 pneumatically, fully releases the brakes by connecting the brake cylinder to exhaust through the retainer port RET. The present interface 40 provides a gradual release overlay on the direct release function using electrically controlled valve MV-RET. When the service portion 10 of the control valve moves into its release positions, the brake cylinder port BC is connected to the retainer port RET. The pneumatically operated control valve stays in its released condition until the brakes have been released. To modify this to a graduated release, the electrically controlled valve MV-RET cuts off the path between the retainer passage R-10 of the service portion 10 and the retainer passage R-30 of the pipe bracket 30. The retainer passage R-40 in the interface stops the release of the brakes. Reopening it allows further release of the brakes. The engineer at the locomotive can therefore perform gradual release of a pneumatically direct release brake control valve by the activation/deactivation of the retainer valve MV-RET.

The operation described is the same for the interface, whether its connected with a DB-60 of FIG. 1 or ABDW of FIG. 2.

Referring to FIG. 1, the service portion of the DB-60 includes a diaphragm or piston 11 having brake pipe pressure on the top provided via brake pipe passages B-10 and B-11 and auxiliary reservoir pressure on the bottom via auxiliary passages A-10 and A-11. The differential of these pressures operate the service portion to apply and release the brakes. Upward motion of the diaphragm 11, for an initial service application, opens this quick service valve 12 to connect the brake pipe to a quick service chamber QS-Ch, thereby accelerate the dropping of the brake pipe pressure to accelerate application. This upward movement through stem 14 opens the valve 13 connecting the auxiliary reservoir passage A-13 to the brake cylinder passage C-10. When the brake pipe and the auxiliary reservoir pressure across diaphragm 11 become balanced, the diaphragm 11 and the actuator 14 move down to the lap position shown closing valves 13 and disconnecting the auxiliary reservoir A-13 from the cylinder passage C-10.

As previously discussed, the application of the brakes can also be accelerated through the interface 40 and the electronics 50 by activating valve MV-BP to connect the brake pipe passages B-40 and B-41 of the interface to exhaust EX. This operation of the valve accelerates the unbalancing of the diaphragm 11 to operate the actuator 14 and the valve 13.

For a pneumatically-actuated release, the brake pipe pressure increases on the top of diaphragm 11 causing it to move downward. This causes the actuator 14 to move away from valving element 13 connecting the brake cylinder passage C-10 to the retainer passage R-10 through passage 15 in the interior of the actuator 14. Once the equilibrium across the diaphragm 11 has been achieved, the balancing of the brake pipe pressure and the auxiliary pressure reservoir, the actuator 14 moves up, seating against valving 13 and terminating the venting of the brake cylinder.

As previously discussed, for a stuck brake which has not been released, the piston 11 can be unbalanced by reducing the pressure in the auxiliary reservoir, using that valve MV-AR in the interface 40. This reduces the pressure below the diaphragm 11, moving the actuator 14 downward to connect the brake cylinder passage C-10 to exhaust via the retainer passage R-10.

The service section 10 also includes an accelerated release valve, including a diaphragm 16, having auxiliary reservoir pressure on the right side via passage A-14 and brake pipe pressure on the left side via brake pipe passage B-13. The emergency reservoir is connected via emergency reservoir passage E-10 and check valves 17 and 18 controlled by the diaphragm 16 to the brake pipe passage B-13. When the brake pipe pressure on the left side of the diaphragm 16 is greater than the auxiliary pressure on the right side of the diaphragm, the diaphragm 16 moves to the right releasing the check valves to open as long as the emergency reservoir pressure is greater than the brake pipe pressure. The open valves 17 and 18 connect the emergency reservoir passage E-10 to the brake pipe passage B-13. This provides a substantial increase in the brake pipe pressure in the brake pipe itself, as well as on the top of diaphragm 11. This accelerates the release operation of this service valve portion 10 as well as propagating the charging of the brake pipe and therefore the release signal down the brake pipe to adjacent cars.

The electrically-controlled valve MV-ER and its pilot valve PV operate in parallel to the pneumatic accelerated application valve of the service portion 10 and can connect the emergency reservoir passage E-40 to the brake pipe passage B-40. This also increases the speed of operation of the diaphragm 11 and propagation of the release signal down the brake pipe.

Thus, it can be seen that the interface 40 with the electronics 50 can augment, assist and overlay the pneumatic operation of the service portion 10, as well as providing additional features. By controlling the fluid signal flow between the pipe bracket 30 and the service portion 10, the fluid signals used to operate the service portion 10 and its interconnection to the brake pipe and the brake cylinder can be aided, modified and controlled. Other than duplicating the function of the accelerated application of valving elements 17 and 18, the interface generally augments all other functions. It provides the additional functions of releasing a stuck brake, as well as the ability to produce graduated release.

Turning to FIG. 2, the service portion 10 of the ABDW includes a diaphragm 11 having brake pipe pressure on the top via brake pipe passages B-10, B-11 and auxiliary reservoir pressure on the bottom via auxiliary reservoir passages A-10, A-11. The differential pressure across the diaphragm 11 controls the position of actuator 14 which interconnects the various passages to effect operation of the brake cylinder.

For service application, the brake pipe pressure is reduced and the diaphragm 11 moves up. Initially, the brake pipe passage B-12 is connected to brake pipe passage B-16 on the quick service volume QS VOL by the sliding actuator 14. This movement of actuator 14 also disconnects the brake cylinder passage C-10 from the retainer passage R-10 and connects it to the auxiliary reservoir through the auxiliary pressure at the bottom of the diaphragm 11. Once the equilibrium of the auxiliary reservoir to the brake pipe is reached, the diaphragm 11 is moved down again to a position hydraulically locking the pressure in the brake cylinder.

To release the brakes, the brake pressure at the top of the diaphragm 11 is increased greater than the auxiliary reservoir pressure at the bottom of the diaphragm, and the actuator 14 moves down to the position shown in FIG. 2. This connects the brake cylinder passage C-10 to the retainer passage R-10, thereby venting the brake cylinder. The operation of the valve MV-RET can open and close the passage R-10 and R-40, and thereby provide gradual release of the brakes.

To accelerate the application of the brakes, or to initiate application of the brakes, the actuation of valve MV-BP connects the brake pipe passage B-10 at the top of the diaphragm 11 to exhaust, thereby creating an imbalance on the diaphragm 11, causing it to move to its brake application position.

An accelerated release portion of the service portion 10 includes a diaphragm 16 having brake pipe pressure on the right side via brake pipe passages B-14 and B-13 and auxiliary reservoir pressure on its left side by auxiliary passage A-14 connected to the chamber below the diaphragm 11. Upon an increase of the brake pipe pressure on the right side of the diaphragm 16, it opens valve 18 to connect the emergency reservoir passage E-10 to the brake pipe passage B-15, which connects to brake pipe passage B-13 through flow check 17. As previously described, this not only accelerates the operation of piston 11 for the local release function, but charges the brake pipe to increase the transmission of the brake pipe release down the brake pipe.

The only modification required in providing the interface 40 between the pipe bracket 30 and the service portion 10 are longer mounting bolts using the same mounting holes as previously used for mounting the service portion 10 to the pipe bracket 30. The present interface 40, by being at the commonly defined interface porting of the pipe bracket 30 of the service portion 10, allows it to have universal use and not being specifically designed for any particular service portion.

Although the present interface 40 has been shown as a separate and distinct element from the pipe bracket 30 and the service portion 10, since it is designed as a retrofit, it may also be a combined or an integral with the pipe bracket 30. This will continue to allow the interchangeability of service portions 10 to the pipe bracket 30 without being specifically designed for any specific service portion 10.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An electropneumatic retrofit unit for a pneumatic brake control valve having a pipe bracket and at least a service brake portion interconnected at brake pipe ports, brake cylinder ports, auxiliary reservoir ports, emergency reservoir ports and exhaust ports, the retrofit unit comprising:

a brake pipe passage connecting brake pipe ports which mate with said control valve brake pipe ports;

a brake cylinder passage connecting brake cylinder ports which mate with said control valve brake cylinder ports;

an auxiliary reservoir passage connecting auxiliary reservoir ports which mate with said control valve auxiliary reservoir ports;

an emergency reservoir passage connecting emergency reservoir ports which mate with said control valve emergency reservoir ports;

an exhaust passage connecting exhaust ports which mate with said control valve exhaust ports;

a first electrically controlled valve selectively connecting said brake pipe passage to a venting port for applying a brake; and a second electrically controlled valve selectively interconnecting said brake pipe passage and said emergency reservoir passage for releasing said brake.

2. A retrofit unit according to claim 1 wherein said second valve includes a third pneumatic valve controlling said interconnecting of said brake pipe passage and said emergency reservoir passage and a fourth electrically controlled valve selectively connecting at least one of said emergency reservoir ports or said venting port to said third valve to operate said third valve.

3. A retrofit unit according to claim 1 including a third electrically controlled valve selectively connecting said auxiliary reservoir passage to a vent port for releasing said brake.

4. A retrofit unit according to claim 3 including electronics on said unit for operating said first, second and third valves.

5. A retrofit unit according to claim 4 including transducers connected to said electronics forming pressure in said brake pipe passage and said brake cylinder passage and said electronics operating said third valve to connect said auxiliary reservoir passage to said vent port for a stuck brake.

6. A retrofit unit according to claim 5 further including a transducer connected to said electronics for sensing pressure in said auxiliary reservoir passage and said electronics operating said second valve to interconnect said brake pipe passage and said emergency reservoir passage when the brake pipe passage pressure is greater than the auxiliary passage pressure.

7. A retrofit unit according to claim 1 including electronics on said unit for operating said first and second valves; transducers connected to said electronics for sensing pressure in said brake pipe passage and said auxiliary reservoir passage; and said electronics operating said second valve to interconnect said brake pipe passage and said emergency reservoir passage when the brake pipe passage pressure is greater than the auxiliary passage pressure.

8. A retrofit unit according to claim 7 wherein said electronics includes an input for receiving electrical brake control signals to operate said electrically controlled valves.

9. A retrofit unit according to claim 1 including a third electrically controlled valve selectively controlling said exhaust passage for gradually releasing said brake.

10. A retrofit unit according to claim 1 wherein said passages and control valves are capable of mating with any service brake portion which is compatible with said pipe bracket.

11. A retrofit unit according to claim 1 including a second brake pipe passage connecting a second pair of brake ports which mate with a second pair of control valve brake pipe ports.

12. An electropneumatic brake control valve having a pneumatic service brake portion and a pneumatic emergency brake portion connected to a pipe bracket, the pipe bracket comprising:

a brake pipe passage connecting a brake pipe port to said service and emergency portions;

a brake cylinder passage connecting a brake cylinder port to said service and emergency portions;

an auxiliary reservoir passage connecting an auxiliary reservoir port to said service portion;

an emergency reservoir passage connecting an emergency reservoir port to said service and emergency portions;

a retainer passage connecting an exhaust port to said service portion;

a first electrically controlled valve selectively connecting said brake pipe passage to a venting port for applying a brake;

a second electrically controlled valve selectively interconnecting said brake pipe passage and said emergency reservoir passage for releasing said brake;

transducers for sensing pressure in said brake pipe passage and said auxiliary reservoir passage; and electronics connected to said transducers and operating said second valve to interconnect said brake pipe passage and said emergency reservoir passage when the brake pipe passage pressure is greater than the auxiliary passage pressure and operating said first valve.

13. A control valve according to claim 12 wherein said second valve includes a third pneumatic valve controlling said interconnecting of said brake pipe passage and said emergency reservoir passage and a fourth electrically controlled valve selectively connecting said emergency reservoir port or said venting port to said third valve to operate said third valve.

14. A control valve according to claim 12 including a third valve electrically controlled by said electronics for selectively connecting said auxiliary reservoir passage to a vent port for releasing said brake.

15. A control valve according to claim 14 including transducers connected to said electronics for sensing pressure in said brake pipe passage and said brake cylinder passage and said electronics operating said third valve to connect said auxiliary reservoir passage to said vent port for a stuck brake.

16. A control valve according to claim 12 wherein said electronics includes an input for receiving electrical brake control signals to operate said electrically controlled valves.

17. An electropneumatic brake control valve having a pneumatic service brake portion and a pneumatic emergency brake portion connected to a pipe bracket, the pipe bracket comprising:

a brake pipe passage connecting a brake pipe port to said service and emergency portions;

a brake cylinder passage connecting a brake cylinder port to said service and emergency portions;

an auxiliary reservoir passage connecting an auxiliary reservoir port to said service portion;

an emergency reservoir passage connecting an emergency reservoir port to said service and emergency portions;

a retainer passage connecting an exhaust port to said service portion;

a first electrically controlled valve selectively connecting said brake pipe passage to a venting port for applying a brake;

a second electrically controlled valve selectively interconnecting said brake pipe passage and said emergency reservoir passage for releasing said brake; and a third electrically controlled valve selectively connecting said auxiliary reservoir passage to a vent port for releasing said brake.

18. A control valve according to claim 17 including electronics on said pipe bracket for operating said first, second and third valves; transducers connected to said electronics for sensing pressure in said brake pipe passage and said brake cylinder passage; and said electronics operating said third valve to connect said auxiliary reservoir passage to s aid vent port for a stuck brake.

19. A control valve according to claim 17 including electronics on said pipe bracket having an input for receiving electrical brake control signals to operate said electrically controlled valves.

20. An electropneumatic brake control valve having a pneumatic service brake portion and a pneumatic emergency brake portion connected to a pipe bracket, the pipe bracket comprising:

a brake pipe passage connecting a brake pipe port to said service and emergency portions;

a brake cylinder passage connecting a brake cylinder port to said service and emergency portions;

an auxiliary reservoir passage connecting an auxiliary reservoir port to said service portion;

an emergency reservoir passage connecting an emergency reservoir port to said service and emergency portions;

a retainer passage connecting an exhaust port to said service portion;

a first electrically controlled valve selectively connecting said brake pipe passage to a venting port for applying a brake;

a second electrically controlled valve selectively interconnecting said brake pipe passage and said emergency reservoir passage for releasing said brake; and a third electrically controlled valve selectively controlling said retainer passage for gradually releasing said brake.

21. A control valve according to claim 20 including fourth electrically controlled valve selectively connecting said auxiliary reservoir passage to a vent port for releasing said brake.

22. A control valve according to claim 21 including electronics on said pipe bracket for operating said first, second, third and fourth valves; transducers connected to said electronics for sensing pressure in said brake pipe passage and said brake cylinder passage; and said electronics operating said fourth valve to connect said auxiliary reservoir passage to said vent port for a struck brake.

23. A control valve according to claim 20 including electronics on said pipe bracket for operating said first, second and third valves; transducers connected to said electronics for sensing pressure in said brake pipe passage and said auxiliary reservoir passage; and said electronics operating said second valve to interconnect said brake pipe passage and said emergency reservoir passage when the brake pipe passage pressure is greater than the auxiliary passage pressure and operating said first valve.

24. A control valve according to claim 23 wherein said electronics includes an input for receiving electrical brake control signals to operate said electrically controlled valves.

* * * * *